3,498,852
ACCELERATING LITHIUM DRIFTING
IN GERMANIUM
Marco A. Jamini, Mayfield Heights, Ohio, assignor to the United States of America as represented by the United States Atomic Energy Commission
No Drawing. Filed Mar. 10, 1969, Ser. No. 805,864
Int. Cl. H01l 7/48
U.S. Cl. 148—186  3 Claims

ABSTRACT OF THE DISCLOSURE

A method of improving the lithium drift in a germanium crystal detector by exposing the detector during drift to infra red radiation in which the spectrum below $40\mu$ has been removed. Removal is accomplished by passing the infra red through a germanium window.

BACKGROUND OF THE INVENTION

Prior to the development of semi-conductor radiation counter devices, the detection and measurement of radiation was carried out principally in gaseous ionization chambers. The application of solid state counting devices to the measurement of radiation made it possible, due to their greater density and stopping power, to achieve complete absorption in much smaller volumes while at the same time obtaining greater ruggedness and speed of operation.

In the detection of gamma radiation, lithium-drifted germanium detectors have been produced which have relatively large volumes sensitive to gamma rays. A detector of this type may be produced by taking an ingot of horizontally grown p-type germanium of about 1½ inches in diameter and diffusing lithium in the two opposite surfaces thereby producing an $n^+pn^+$ structure with two diodes back to back. The ingot is then subject to an AC voltage and the lithium is drifted into the germanium from the two surfaces on alternate half cycles of the AC field. When the two drifted regions meet, producing a compensated region of about 2 cm., one of the n-contacts on the germanium is removed and a p-contact is substituted. The germanium produces the electrical impulses in response to the incident gamma radiation while the drifted lithium acts to cancel or neutralize the effect of the acceptor-doping, and thus the region containing the lithium is referred to as the compensated region. The resultant pIn detector is an excellent device for detecting and measuring gamma radiation and is finding widespread use in a variety of applications including that of monitoring gamma radiation in and around nuclear reactors. In my application Ser. No. 665,688, filed on Sept. 1, 1967, relating to a "P-Contact for Compensated P-Germanium Crystal," I describe in greater detail this type of detector.

One of the problems involved in the use of lithium drifted germanium gamma ray detectors is the time involved in and hence the cost resulting from the lithium drifting of the crystal. For example, it takes several days to obtain the desired lithium drifted depth into the crystal under current techniques.

SUMMARY OF THE INVENTION

The invention described herein was made in the course of, or under a contract with, the United States Atomic Energy Commission.

The present invention makes it possible to reduce substantially the time it takes to accomplish the drift process of lithium into the crystal while at the same time not only maintaining better compensation but actually improving the compensation of the crystal. As is understood in the art, improved compensation of the crystal makes it possible to permit a higher bias on the detector during use with the result that better resolution is obtained. Improved compensation produces the result of reducing the detector capacitance which, in turn, is roughly inversely proportional to the compensation depth in germanium. Hence, in the application of this invention, it has been discovered that not only is the lithium drifted into the crystal at a more rapid rate, but the detector produced is of better quality.

In accordance with this invention, the improvement in lithium drifting is obtained by subjecting the crystal during drift process to infra red radiation in which the portion of spectrum to which the germanium is not transparent is removed. Drifting of the lithium into the germanium is accomplished by applying a reverse electrical bias to the diode which is prepared by initially diffusing lithium into one surface by heat. Under the described condition, only the lithium is warmed by the radiation due it is believed by more lithium atoms being ionized and is given greater mobility in the crystal, thereby resulting in quicker and greater diffusion. However, as the lithium is ionized and if the crystal were also heated by the radiation, other charged particles would be ionized and produce leakage current. The presence of leakage current in the germanium crystal during application of reverse bias to produce drifting of the lithium tends to cancel out the effect of the bias and thus interfere with the drifting. Therefore, in this invention, heating of the crystal is avoided during the radiation heating by utilizing a filter to remove the portion of infra red to which the germanium is not transparent.

Blocking of the unwanted portion of the infra red is accomplished by subjecting the crystal during drifting to the infra red radiation through a transparent germanium window which absorbs the portions of the infra red which would heat the crystal material but at the same time passing the portion of the infra red which ionizes the lithium in the crystal.

It is thus a principal object of this invention to provide an improved way of preparing a compensated lithium drifted germanium detector.

Other objects and advantages of this invention will hereinafter become more apparent from the following description of a preferred embodiment of this invention.

DESCRIPTION OF THE PREFERRED EMBODIMENT

A lithium drifted germanium detector may be prepared by coating one surface of a polished germanium crystal having a pair of oppositely facing surfaces with a hot oil emulsion of melted lithium. The crystal is then warmed to about 400° C. and after at least ten minutes at that temperature, the emulsion is wiped away and the coated surface etched away to remove surface defects. The crystal in this form is, in effect, a diode because of the effect of the layer of lithium diffused into one surface, as understood in the art. The crystal is then subject to a DC voltage in a reverse bias orientation for several days to cause the lithium to drift into the crystal. Some cooling may be provided for the crystal to minimize leakage current due to the heating effect of the current flow.

In accordance with this invention, it has been found that the drifting process may be made to occur at a much faster rate and that the capacitance of the final detector may be reduced to an extent not heretofore thought to be possible. This is accomplished by exposing the germanium crystal during drifting to infra red radiation from which the component which is absorbed by the germanium is removed and which retains the portion of the spectrum absorbed by the lithium.

The following examples illustrate the invention:

EXAMPLE 1

A pair of crystal slices were prepared from a piece of commercially available horizontally grown p-germanium. The flat, parallel surfaces of the crystals were etched to remove surface defects and a hot oil emulsion of melted lithium coated on one of the surfaces of each crystal. To diffuse lithium into the crystal surfaces, each coated crystal was maintained in an oven at a temperature of about 400° C. for about ten minutes in addition to time necessary to heat the crystals up and cool them off gradually afterward. After cooling to room temperature, the remaining emulsion was washed away in water leaving lithium coated flat surfaces on the crystal.

One of the crystals was then placed with its lithium diffused surface faced downward on a copper block which was cooled with water at 12° C. A DC power supply was placed across the crystal and copper block in a reverse bias orientation with respect to the crystal which is a diode as a result of the lithium impregnated surface. After four days of such biasing, the crystal was removed and examined for depth of lithium protection and capacitance. The latter was measured to be 60 pf. (picofarad).

EXAMPLE 2

The second crystal was similarly placed on a cooled copper block and similarly exposed to a DC reverse biasing voltage for four days. However, during the period of drifting, the crystal was exposed to infrared radiation through a window of 2 mm. thick slice of transparent germanium which removed radiation of wave length below $40\mu$. After four days the crystal was removed and examined. It was found that the lithium had drifted to a depth which was 30% greater than that of the crystal not subject to infrared, and that its capacity was measured to be 30 pf. as compared to 60 pf. for the crystal in the first example.

These examples illustrate that the infrared when applied to be absorbed by the lithium and not by the germanium crystal enhances the drift of the lithium and improves the compensation of the detector. As the lithium absorbs infrared in the 50–100 micron range and germanium absorbs infrared whose wavelength is less than $40\mu$, in accordance with this invention, infrared with a wavelength above that of $40\mu$ is applied.

It is thus seen that there has been provided a unique method of preparing germanium detectors having improved characteristics at a speed not heretofore found to be possible.

While only a preferred embodiment of the invention has been described, it is understood that the invention is to be defined only by the scope of the following claims.

What is claimed is:
1. In the method of preparing a lithium compensated germanium detector, the improvement comprising:
   (a) impregnating with melted lithium one surface of a germanium crystal having a pair of oppositely facing surfaces;
   (b) drifting said lithium into said crystal by applying a reverse electrical bias to said crystal; and
   (c) simultaneously exposing said crystal during drifting to infrared radiation whose wavelength is above that of $40\mu$.
2. The method of claim 1 in which the spectrum of said radiation whose wavelength is below that of $40\mu$ is removed by passing the radiation through a window of germanium.
3. The method of claim 2 in which the crystal is impregnated initially with lithium by heating at about 400° C. for about ten minutes within a hot oil emulsion of lithium coated on the surface to be impregnated.

References Cited
UNITED STATES PATENTS 3,310,443   3/1967   Fessier et al. _____ 148—188

L. DEWAYNE RUTLEDGE, Primary Examiner

R. A. LESTER, Assistant Examiner

U.S. Cl. X.R.

29—584; 148—1.5